United States Patent
Marco et al.

(10) Patent No.: US 11,755,960 B2
(45) Date of Patent: Sep. 12, 2023

(54) SYSTEM AND METHOD FOR RESERVING DRIVERS WITH MINIMUM FARE OFFERS AND NAVIGATING DRIVERS TO SERVICE TRANSPORTATION REQUESTS

(71) Applicant: Lyft, Inc., San Francisco, CA (US)

(72) Inventors: Talmon Marco, Tel Aviv (IL); Igor Magazinik, Ramat Gan (IL)

(73) Assignee: Lyft, Inc., San Francisco, CA (US)

( * ) Notice: Subject to any disclaimer, the term of this patent is extended or adjusted under 35 U.S.C. 154(b) by 986 days.

(21) Appl. No.: 15/586,409

(22) Filed: May 4, 2017

(65) Prior Publication Data
US 2018/0322420 A1  Nov. 8, 2018

(51) Int. Cl.
| | |
|---|---|
| *G06Q 10/02* | (2012.01) |
| *G06Q 50/30* | (2012.01) |
| *G08G 1/00* | (2006.01) |
| *G06Q 10/0631* | (2023.01) |
| *G06Q 30/0283* | (2023.01) |

(52) U.S. Cl.
CPC ....... *G06Q 10/02* (2013.01); *G06Q 10/06311* (2013.01); *G06Q 30/0284* (2013.01); *G06Q 50/30* (2013.01); *G08G 1/202* (2013.01)

(58) Field of Classification Search
CPC ............ G06Q 10/02; G06Q 10/06311; G06Q 30/0284; G06Q 50/30; G08G 1/202
USPC .......................................................... 705/5
See application file for complete search history.

(56) References Cited

U.S. PATENT DOCUMENTS

| | | | | |
|---|---|---|---|---|
| 10,187,745 | B1 * | 1/2019 | Zhao | H04W 4/021 |
| 2012/0041675 | A1 * | 2/2012 | Juliver | G06Q 10/08 |
| | | | | 701/465 |
| 2013/0246207 | A1 * | 9/2013 | Novak | G06Q 30/0283 |
| | | | | 705/26.2 |
| 2013/0268406 | A1 * | 10/2013 | Radhakrishnan | G06Q 30/0284 |
| | | | | 705/26.61 |

(Continued)

FOREIGN PATENT DOCUMENTS

CA     3034405 A1 *  3/2018  ............. G06Q 10/02

OTHER PUBLICATIONS

"Lyft Guarantees Dissected", Apr. 21, 2016, https://web.archive.org/web/20160421041610/http:/therideshareguy.com/lyft-guarantees-dissected (Year: 2016).*

(Continued)

*Primary Examiner* — Shannon S Campbell
*Assistant Examiner* — Lisa Ma
(74) *Attorney, Agent, or Firm* — Keller Preece PLLC

(57) ABSTRACT

In one embodiment, a method comprises determining, based on one or more metrics indicative of passenger demand and driver supply associated with a transportation service, to send a first minimum fare offer to a first driver, the first minimum fare offer specifying a first minimum amount of compensation to be provided to the first driver for a first time period; tracking compensation accrued by the first driver during the first time period for servicing at least one ride for the transportation service; and determining compensation for the driver for the first time period, wherein the determined compensation is the greater of the first minimum amount of compensation specified in the first minimum fare offer and the tracked compensation accrued by the first driver during the first time period for servicing the at least one ride for the transportation service.

20 Claims, 5 Drawing Sheets

(56) References Cited

U.S. PATENT DOCUMENTS

| | | | | |
|---|---|---|---|---|
| 2015/0206267 | A1* | 7/2015 | Khanna | G06Q 50/30 |
| | | | | 705/417 |
| 2016/0171574 | A1* | 6/2016 | Paulucci | G06Q 50/30 |
| | | | | 705/13 |
| 2016/0247247 | A1* | 8/2016 | Scicluna | G06Q 50/30 |
| 2016/0335576 | A1* | 11/2016 | Peng | G06Q 10/06315 |
| 2017/0098224 | A1 | 4/2017 | Marco et al. | |
| 2017/0200321 | A1* | 7/2017 | Hummel | G06Q 30/0609 |
| 2018/0101925 | A1* | 4/2018 | Brinig | G07F 17/0057 |
| 2019/0154454 | A1* | 5/2019 | Verma | G06Q 50/30 |

OTHER PUBLICATIONS

"Uber Guarantees Dissected", Apr. 21, 2016, https://web.archive.org/web/20160421021357/https://therideshareguy.com/uber-guarantees-dissected/ (Year: 2016).*

Lazarro, Sage. Observer "Uber Drivers Plan Boycott After Fare Cuts Slash Their Earnings Below Minimum Wage". Published Jan. 19, 2016. https://observer.com/2016/01/uber-drivers-plan-boycott-after-fare-cuts-slash-their-earnings-to-below-minimum-wage/ (Year: 2016).*

Rideshary. "Lyft Hourly Guarantee Explained" Published Mar. 15, 2016. https://www.youtube.com/watch?v=7g-5YMtowRA (Year: 2016).*

The extended European Search Report for EP Application No. 18168047.1-1222, dated Oct. 11, 2018, 10 pages.

Office Action for EP Application 18168047.1-1222, dated Aug. 26, 2019.

Office Action as received in Israeli Application 258296 dated Dec. 8, 2020.

Summons to attend oral proceedings EP Application 18168047.1 Jul. 23, 2020.

S. Ma, Y. Zheng and O. Wolfson, "Real-Time City-Scale Taxi Ridesharing," in IEEE Transactions on Knowledge and Data Engineering, vol. 27, No. 7, pp. 1782-1795, Jul. 1, 2015, doi: 10.1109/TKDE.2014.2334313.

* cited by examiner

SYSTEM AND METHOD FOR RESERVING DRIVERS WITH MINIMUM FARE OFFERS AND NAVIGATING DRIVERS TO SERVICE TRANSPORTATION REQUESTS

TECHNICAL FIELD

This disclosure relates in general to the field of mobile applications and, more particularly, to a system and method for reserving drivers with minimum fare offers and navigating drivers to service transportation requests.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment, a method comprises determining, based on one or more metrics indicative of passenger demand and driver supply associated with a transportation service, to send a first minimum fare offer to a first driver, the first minimum fare offer specifying a first minimum amount of compensation to be provided to the first driver for a first time period; tracking compensation accrued by the first driver during the first time period for servicing at least one ride for the transportation service; and determining compensation for the driver for the first time period, wherein the determined compensation is the greater of the first minimum amount of compensation specified in the first minimum fare offer and the tracked compensation accrued by the first driver during the first time period for servicing the at least one ride for the transportation service.

Example Embodiments

Figure 1:
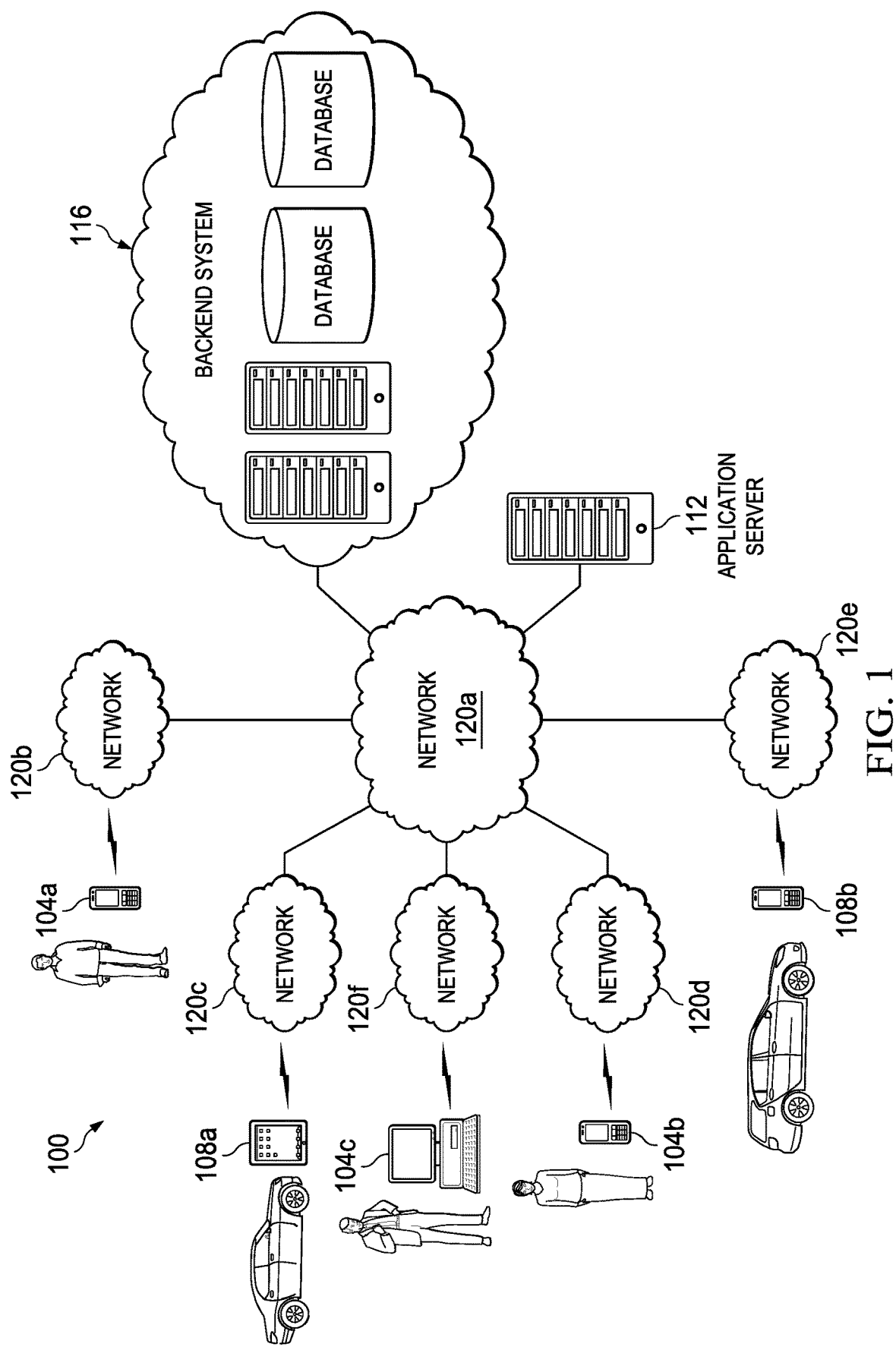
FIG. 1 illustrates a block diagram of a transportation system in accordance with certain embodiments.

FIG. 1 illustrates a block diagram of a transportation system 100 in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of passengers and drivers associated with a transportation service by offering drivers incentives to service transportation requests from the transportation service during a particular time period (e.g., during rush hour or other busy period). It is fairly common for drivers to be affiliated with (i.e., service transportation requests received from) multiple transportation services, any of which could send a transportation request to the driver at a particular moment. In various embodiments, a transportation service reserves drivers to service transportation requests for the transportation service (and to forego transportation requests from other transportation services) by sending the driver an minimum fare offer specifying a minimum fare amount to incentivize the driver to service requests for the transportation service for a specified period of time. Various embodiments may provide technical advantages such as improving the speed at which a transportation request may be sent to a driver (e.g., due to the increased availability of drivers), reducing processing and communication resources expended during a search for an available driver, and other technical advantages.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or other operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., including the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), or car preference information (e.g., what models or color of car the user prefers).

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected, e.g., through a deduction that the driver's device is not logged into the transportation service through the driver application), or the driver may be "inactive," meaning that the driver only desires to receive particular requests meeting certain exception criteria.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term computing device, is intended to encompass any suitable processing device. For example, portions of backend system 116 (including backend server 302) or application server 112 may be implemented using servers (including server pools) or other computers.

Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
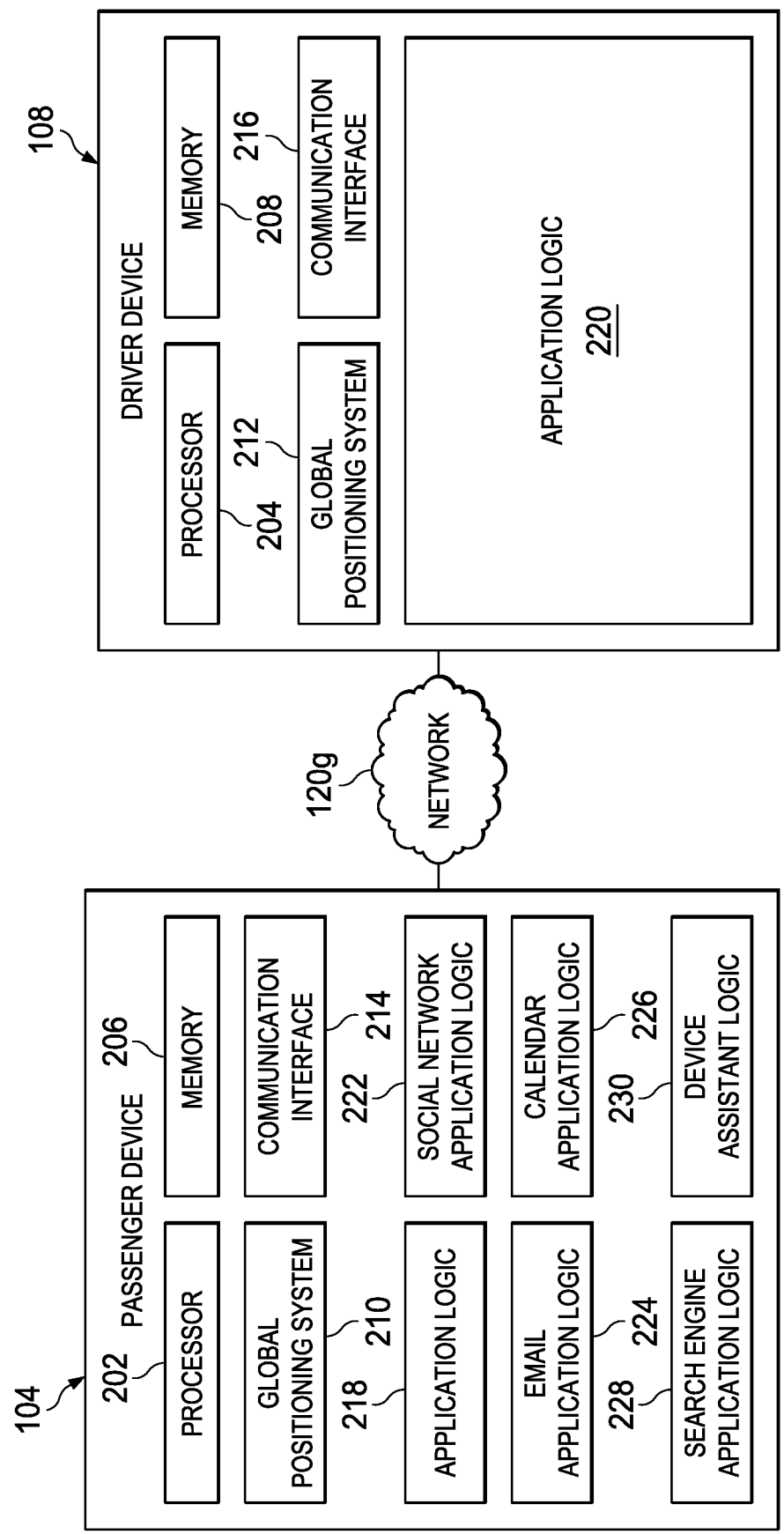
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber that has registered an account with the transportation service or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processor 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the passenger application described herein. Similarly, application logic 220 may include logic providing, at least in part, the functionality of the driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media or communication system (e.g., TWITTER, GMAIL, etc.) to the transportation service through application logic 218. The transportation service (e.g., through backend server) may then access the user's account on the social network system or other social media or communication system and access information associated with the user's account. As another example, passenger application logic 218 may access the user's social media or other account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In a particular embodiment, the social network system allows users to create events, invite others to events, and to indicate attendance at such events. An event may comprise a gathering of a plurality of people for any suitable purpose. Examples of events include concerts, sporting events (e.g., baseball, football, soccer, basketball, hockey, boxing, or other sports), parades, airplane arrivals, community gatherings, or other suitable gatherings. A record for an event stored by the social network system may include any suitable information, such as the name of the event, the type of event, the time and date of the event, the location of the event, a record of users that were invited to the event as well as an indication of whether the users have accepted, declined, or not yet responded to the invitation, or other suitable information about the event.

In various embodiments, the social network system may interact with passenger application logic 218 and/or backend server 302 to enhance the functionality of these components. As an example, events created in the social network system may be provided to the backend server 302 through an API or other interface to a data store of the social network system. In one embodiment, the social network system may allow backend server 302 to access events independent of a user login associated with a passenger or driver. For example, the social network system may have an arrangement with the transportation service to provide events created in the social network system to the transportation service. In another embodiment, backend server 302 may access the events visible by the transportation service's administrators, passengers, and/or drivers via their respective login credentials to the social network system.

In various embodiments, the social network system may provide any of the functionality listed above with respect to passenger application logic 218 in allowing a user to request a ride from an event and may relay received requests for rides to backend server 302 along with any suitable identifying information about the user to facilitate pickup by a driver. In one embodiment, information associated with requesting a ride from the event may be provided on an event page (e.g., a page that displays the details of the event) viewed by the user using social network application logic 222, a network browser, or other means. The information associated with requesting a ride may include instructions to or an interface (e.g., a link) to request a ride through the social network system, instructions to or a link to download passenger application logic 218 in order to request a ride, an advertisement about the transportation service along with an indication that the transportation service may provide a ride from the event, a coupon for a discounted ride from the event, or other suitable information facilitating the request of a ride from a user (who may or may not already be a customer of the transportation service). In another embodiment, information associated with requesting a ride may be sent to the user by the social network system through the social network application logic 222 (e.g., via a push notification) or other means (e.g., email, text messaging). In various embodiments, the information associated with requesting a ride from the event is provided to the user in response to a determination that the user is at the event.

Email application logic 224 may provide an interface for the passenger to read, draft, and/or manage emails. Email application logic 224 may comprise a traditional email client (e.g., Microsoft Outlook or a native iOS or Android mail application) or a web-based email application (e.g., a web browser or other application operable to access Outlook.com, Gmail, Yahoo! Mail, or other web-based email service).

Calendar application logic 226 may provide an interface for the passenger to read, draft, and/or manage calendar appointments and related tasks. Calendar application logic 226 may comprise a traditional calendar client (e.g., Microsoft Outlook or a native iOS or Android calendar application) or a web-based calendar application (e.g., a web browser or other application operable to access Outlook.com, Google Calendar, or other web-based calendar service).

Search engine application logic 228 may provide an interface for the passenger to perform Internet keyword searches. In various embodiments, logic 228 is operable to receive input forming a keyword search. In some embodiments, logic 228 may also perform the keyword search by transmitting the search to one or more servers operable to perform the search and provide search results back to logic 228. In other embodiments, logic 228 may communicate the input to another application to perform the keyword search. In various embodiments, logic 228 may present the search results to the passenger via any suitable interface (e.g., a visual or audio interface). In various embodiments, logic 228 may comprise a web browser or other application.

Device assistant logic 230 may comprise logic to enhance the functionality of other applications of passenger computing device 104. In particular embodiments, device assistant logic 230 may comprise an intelligent personal assistant, such as Siri, Cortana, Google Now, or similar assistant. In various embodiment, device assistant logic 230 may monitor activity of the passenger computing device 104, including an operating system or one or more applications of passenger computing device 104. For example, device assistant logic 230 may access emails, instant messages, or text messages sent by, received by, or accessible by email application logic 224 or other logic of passenger computing device 104. As another example, device assistant logic 230 may access calendar appointments available through calendar application logic 226 (which may be stored in a calendar file stored by passenger computing device 104 or on a remote server). As another example, device assistant logic 230 may access search queries made through search engine application logic 228. As another example, device assistant logic 230 may access transportation requests made through passenger application logic 218 or detect when passenger application logic 218 is opened. As another example, device assistant logic 230 may access the location of passenger computing device 104 using data determined by global positioning system 210.

In various embodiments, device assistant logic 230 may enhance the user experience of the passenger by answering questions from the passenger, making recommendations to the passenger, and performing other actions, such as drafting emails, texts, or calendar appointments. In addition to answering questions explicitly asked by the passenger, device assistant logic 230 may proactively obtain information and present the information to the passenger. In various embodiments, the proactive presentation of information is based upon previous user activity with respect to passenger computing device 104. For example, device assistant logic 230 may present or direct the presentation of (e.g., within a web browser) the status of a flight reservation or other travel reservation that the passenger booked or accessed using a web browser of the passenger computing device 104 or for which a confirmation email was received via email application logic 224. As other examples, device assistant logic 230 may direct the presentation of hotel or restaurant reservations, weather information, sporting event information, package tracking information, local movie times, stock prices, news events, or other information based on the passenger's location, emails, calendar appointments, search or browsing history, or other activity.

Device assistant logic 230 may also use information obtained from the operating system or applications of passenger computing device 104 to enhance the user experience of the passenger with respect to the transportation service. For example, information obtained by the device assistant logic 230 may be used to identify events that the passenger may be attending. In various embodiments, device assistant logic 230 may communicate device activity information (which may include at least a subset of the gathered information or other information obtained by processing at least a subset of the gathered information) directly to a server of backend system 116 controlled by the transportation service. In other embodiments, device assistant logic 230 may communicate activity information to a third party server controlled by, for example, the provider of the device assistant logic (e.g., Google, Apple, Microsoft, etc.), which may then communicate the device activity information (or a subset thereof) to a server of backend system 116 controlled by the transportation service. In yet other embodiments, device assistant logic 230 may communicate device activity information with passenger application logic 218 which may then communicate device activity information (or a subset thereof) to the backend system 116.

In various embodiments of the present disclosure, in addition to any combination of the features described above with respect to the driver application, driver application logic 220 may provide additional features for the driver application to enhance the functionality of the transportation service. For example, driver application logic 220 may receive a minimum fare offer from backend system 116 and cause display of the offer to a driver. Driver application logic 220 may also be operable to accept input from the driver regarding whether the driver accepts the offer. Driver application logic 220 may also display information (e.g., parameters) associated with the minimum fare offer, such as the time duration of the minimum fare offer, the amount of the minimum fare, other information associated with the offer described herein, or any other suitable information associated with the offer.

Figure 3:
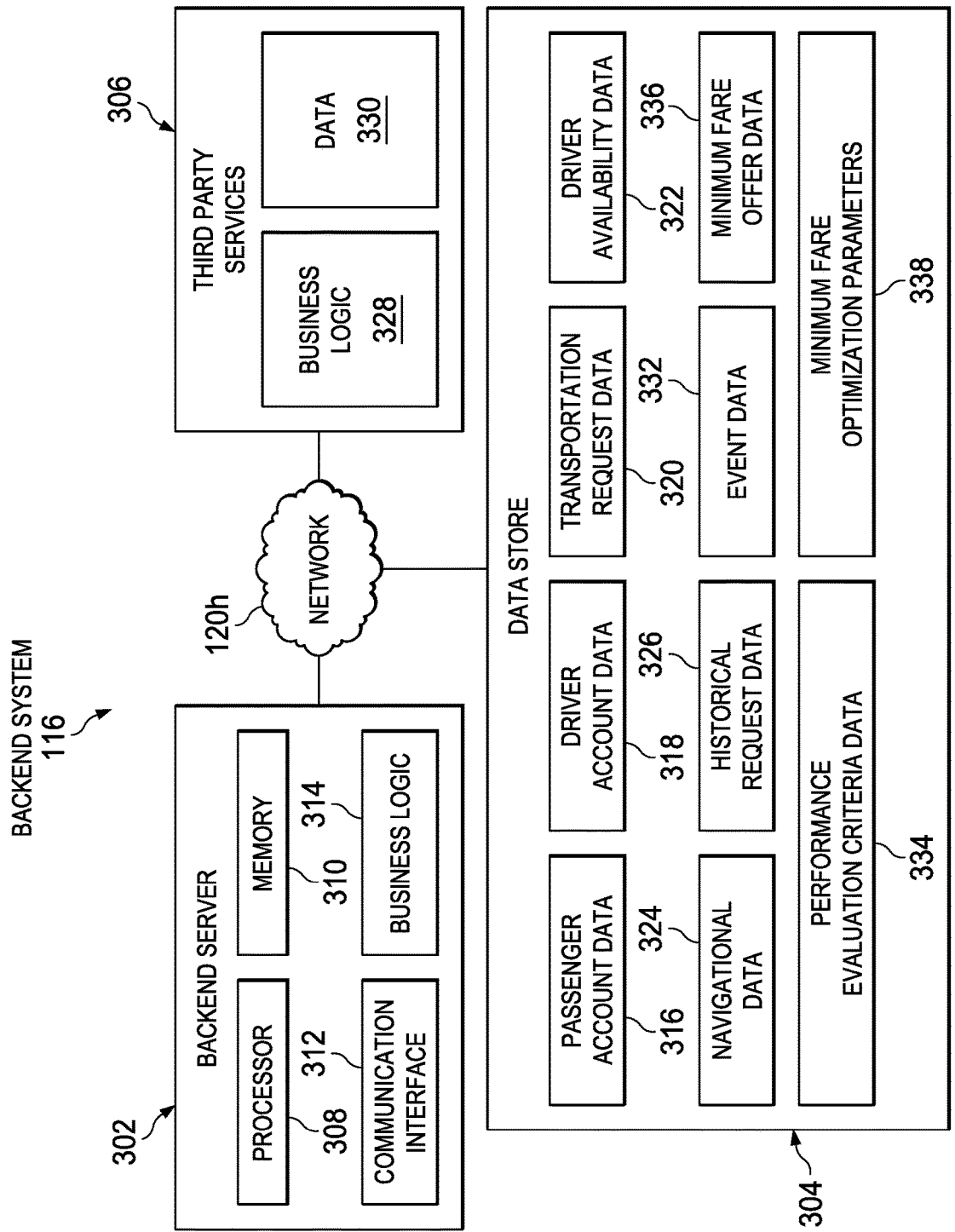
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In various embodiments, one or more of backend server 302, data store 304, and third party services 306 (or portions thereof) may be integrated together on a single device.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, transportation request data 320, driver availability data 322, navigational data 324, and historical request data 326. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). As an example, an entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information.

In various embodiments, driver availability data 322 may include information indicating whether an minimum fare offer has recently been sent to a driver, how much time remains on an minimum fare offer accepted by a driver, whether a minimum fare offer is scheduled to be sent to a driver, when a minimum fare offer is to be sent to a driver (if a minimum fare offer is scheduled), and/or other information associated with an minimum fare offer sent or to be sent to a driver.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

Event data 332 may comprise information about upcoming events, currently occurring events, and events that have already ended. An event may comprise a gathering of a plurality of people for any suitable purpose. Examples of events include concerts, sporting events (e.g., baseball, football, soccer, basketball, hockey, boxing, or other sports), parades, airplane arrivals, community gatherings, or other suitable gatherings. Events identified by the backend server 302 may be events in which a plurality of passengers are likely to request transportation from the transportation service to the event or from the event or events that otherwise may affect the flow of traffic or the availability of drivers.

An entry in event data 332 may include any suitable information about an event, such as a title of the event, a location of the event (which may be expressed in any suitable manner, such as GPS or other coordinates, an address, or a name of the venue at which the event is held), an estimated start time of the event, an estimated end time of the event, passenger pickup locations associated with the event (e.g., one or more ideal locations for drivers to pick up passengers that attended the event), an estimation of the number of people attending the event, an indication of the type of the event (e.g., a baseball game, a concert, an airplane arrival), an event information source associated with the event (e.g., a web address or other identifier of an information source from which current information about the event may be obtained), or other suitable information associated with the event. An entry in event data 330 may include a tracking of and/or an estimate of passenger requests for transportation from passengers that will be or are attending the event. For example, an entry may include an estimation of the aggregate number of passenger requests that will be and/or have been received from passengers at the event and/or a predicted timeline of how many requests have been and/or will be received as a function of time relative to the completion of the event (e.g., an average number of requests per minute received prior to and after the end of the event). In some embodiments, an indication of each passenger request made in association with the event may be stored. Whether a passenger request is associated with the event may be determined in any suitable manner, such as by filtering requests based on a temporal and geographical proximity with the event.

In various embodiments, backend server 302 may classify an event based on the information received from one or more event information sources to facilitate comparison with historical events stored in event data 332. The classification may be based on the source of the event information, key words included in the event information, manual entry of the classification, or other suitable information. As just one example, particular events obtained from a basketball team's website may be classified as basketball games for the particular team. Backend server may analyze historical events with similar classifications in order to determine patterns in start times, end times, and/or the number (and timing of) passenger requests associated with the events in order to more accurately predict the same for upcoming or ongoing events.

In various embodiments, backend server 302 may determine or estimate a start time and/or a completion time for the event. In particular embodiments, backend server 302 may identify the start time or completion time from information provided by an event information source (e.g., the start time, end time, or the duration of the event may be specified by the event information source). In some embodiments, the start time or end time of an event may be estimated based on start times or end times associated with past events of the same type stored in event data 332. In some embodiments, backend server 302 may update the estimated end time of an event one or more times during the event (e.g., periodically during the event). For example, backend server 302 may connect to the event information source to determine how much time is left until the event is over. As various examples, sports websites may include information indicating how far a game has progressed or an airport website may indicate an expected arrival time for a particular flight. Event data 332 may include information about past events that may be used by backend server to determine the number of passenger requests and/or estimated start times or completion times for current or upcoming events stored in event data 332.

In various embodiments, backend server 302 may connect to event information sources through one or more networks to discover events and/or obtain updated information about events. An event information source may include any source containing information about an event. For example, an event information source may be a server hosting a webpage containing event information, a server providing an API through which backend server 302 may request event information from the server, a server providing access to a file (e.g., a calendar file such as an iCalendar or vCalendar file) containing information about one or more events, a computing device which may be used by an administrator to manually enter event information, information obtained from a passenger or driver computing device, or other suitable source. In an embodiment, an event information source includes a social network system. In some embodiments, event information may be uploaded directly to backend server 302 via a flash drive or other means. In one embodiment, backend server 302 may access various websites and parse the data included in the websites to obtain the event information. The event information obtained from one or more event information sources may include any suitable information about an event, such as any of the information stored in event data 332.

In various embodiments, performance evaluation criteria data 334 of data store 304 may specify information describing a performance evaluation scheme for a plurality of drivers of the transportation service that is implemented at least in part by backend server 302. The performance evaluation criteria data 334 may be provided to backend server 302 by any suitable entity, such as an administrator of the transportation service. The performance evaluation criteria data 334 may be updated at any suitable time and may be used to generate performance scores for the drivers.

In various embodiments, the performance evaluation criteria may indicate one or more periods that each specify a time duration over which the drivers are to be evaluated. For example, the performance evaluation period may be a day, a week, a month, a quarter of a year, or other suitable period. A performance evaluation period may be specified using a start time and/or date and an end time and/or date or a duration. Each performance evaluation period may be associated with a set of performance metric data, which may be the same for all performance evaluation periods or may vary from performance evaluation period to performance evaluation period.

The performance metrics may include any suitable indications of the performance of the drivers. Example performance metrics may include revenue brought in through servicing transportation requests and/or fulfilling minimum fare offers, distance traveled transporting passengers, time spent transporting passengers, an amount of time worked by the driver (e.g., time spent with an available status (i.e., a status indicating availability to accept transportation requests) and/or transporting passengers), feedback scores received from passengers, safety record (e.g., a measure of traffic accidents experienced or traffic tickets received), a percentage of received transportation requests that are accepted and serviced, or other suitable performance metrics.

In various embodiments, a single performance metric (e.g., revenue or an amount of time worked), is used to judge the performance of individual drivers. In other embodiments, multiple performance metrics (including any suitable combination of two or more performance metrics described herein or other performance metrics) are used to judge performance.

The performance evaluation criteria data may specify how the performance metrics are to be applied to each driver to generate performance scores for the driver. If a single performance metric is used, a single performance score is calculated. The performance score may be the raw data from the corresponding metric or it may be another value representing a level of performance with respect to the metric. For example, if the performance metric is revenue and the performance score is the raw data, the performance score of an individual driver with respect to the revenue performance metric is the amount of revenue generated by a driver over the performance evaluation period. As another example, if the performance score is another value representing a level of performance with respect to the metric, the raw data may be converted to a value on a performance scale (e.g., a number from 0 to 10). Any suitable scale and conversion methodology may be specified by the performance evaluation criteria data.

When multiple performance metrics are used, the scores associated with each performance metric may be combined to yield a cumulative performance score (if only one performance metric is used, the corresponding performance score is used as the cumulative score for the user). The scores may be combined in any suitable manner. For example, the scores may be added together. As another example, the scores may be averaged. In some embodiments, the performance evaluation criteria data may specify relative weights for each performance metric, such that more important metrics such as revenue may be factored more heavily in the judgment of performance of a driver or group of drivers. Accordingly, in such embodiments, a weighted average (or other calculation taking into accounts the weights of the various performance metrics) of various scores may be calculated to yield a cumulative performance score for a driver.

In various embodiments, a performance score generated from application of any one of the performance metrics may be adjusted based on any suitable criteria, such as a characteristic associated with a driver, to generate an adjusted score for the driver. Any suitable criteria may be used to adjust a performance score, such as a home location of a driver (i.e., the city in which a driver is based), the length of time a driver has been driving for the transportation service, the type of car of the driver, any of the performance metrics described above (e.g., a score representing the revenue generated by a driver may be adjusted based on customer feedback received for the driver or the percentage of rides the driver accepted), or other suitable criteria. After the performance score for the performance metric is adjusted, the adjusted performance score may be used in the calculation of the cumulative performance score for the driver. Alternatively, a cumulative score may be calculated and the cumulative score itself may be adjusted based on any suitable adjustment criteria. A performance score may be adjusted in any suitable manner. In one embodiment, an adjustment multiplier is associated with the adjustment criteria and when the adjustment criteria applies to a particular driver, the adjustment multiplier will be multiplied by the relevant performance score to yield an adjusted performance score. Any other suitable methodology for adjusting performance scores may be used.

Minimum fare offer data 336 may comprise information about minimum fare offers sent to drivers and associated data. For example, minimum fare offer data 332 may include a plurality of entries comprising data associated with minimum fare offers sent to drivers. An entry may include any suitable information associated with an minimum fare offer. For example, an entry may indicate which driver an minimum fare offer was sent to, a minimum compensation amount specified by the minimum fare offer, a duration of the minimum fare offer, a start and/or end time of the minimum fare offer, whether the minimum fare offer was accepted, a history of rides accepted or not accepted by the driver during the duration of the minimum fare offer, and/or other suitable information associated with an minimum fare offer.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

Figure 4:
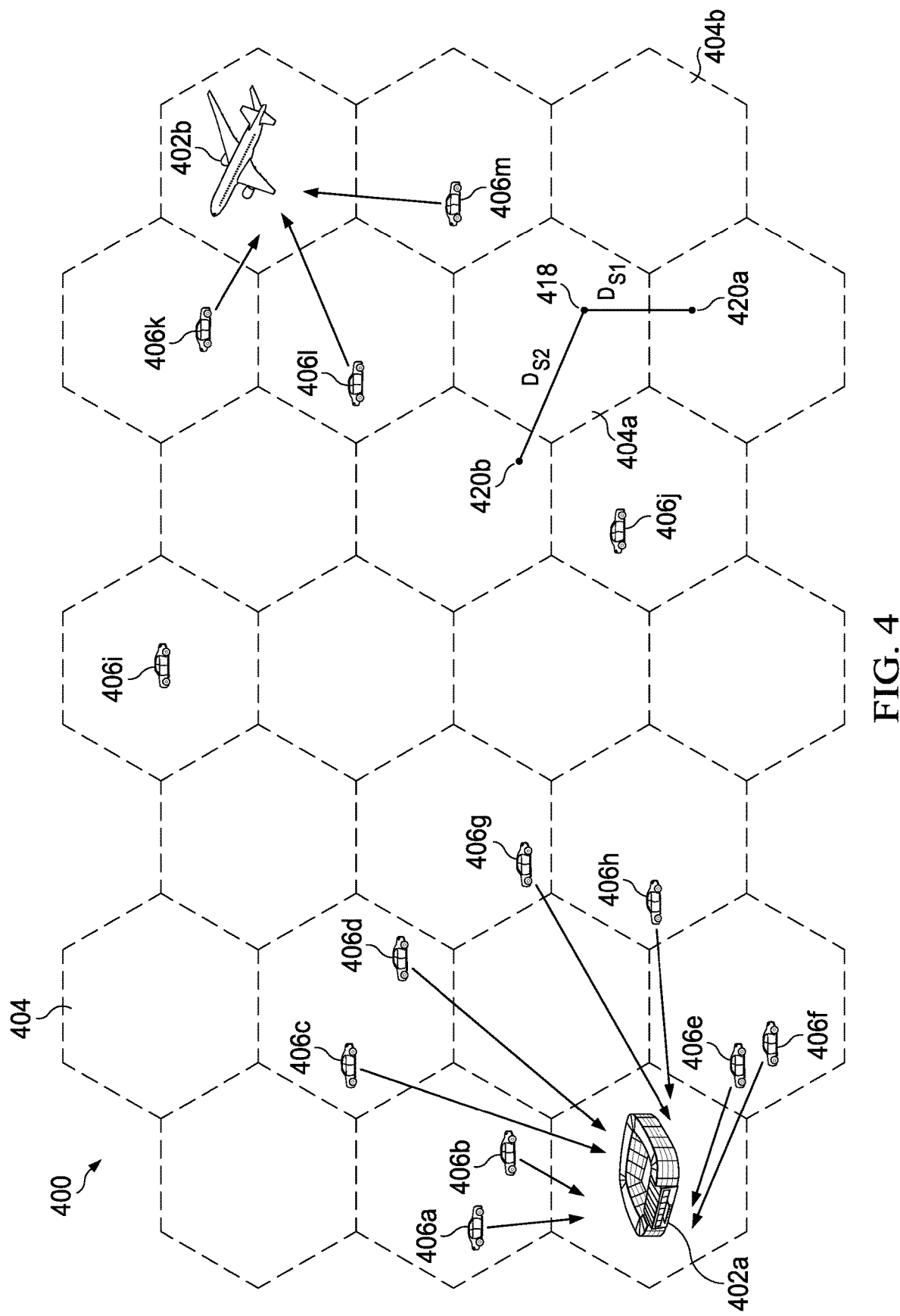
FIG. 4 illustrates a plurality of zones in accordance with certain embodiments.

FIG. 4 illustrates a diagram of various driving zones 404 in accordance with certain embodiments. Although the zones 404 are depicted as hexagonal regions each having the same area, other embodiments may include zones with any suitable geographical delineations. In the depicted embodiment, the zones are of substantially identical and regular shape and size, but this is a nonlimiting example only. In some cases, the size and shape of zones may vary greatly.

For example, a zone may be drawn around an airport 402b, and may only include the airport or the airport and its immediate surrounding areas. Thus a zone could be a single reference location in some instances. As another example, other zones may be drawn around much larger geographic areas (e.g., because they do not contain a point of such specific interest). Although the zones 404 are depicted as contiguous with each other, other embodiments may include non-contiguous zones (e.g., there may be an areas that are not part of any zone). In the embodiment depicted, drivers 406 are located in various zones 404. Diagram 400 also depicts event locations 402a and 402b which are the sites of a football game and an airport at which an airplane is arriving.

In particular embodiments, the zones may be dynamic. That is, the delineation of the zones may be changed by the transportation service over time based on conditions within the zones. For example, if a particular zone sees a drastic reduction in traffic, the zone may be deleted from the zones tracked by the transportation service. As another example, if a particular spot within a zone sees an increase in traffic, one or more new zones may be created or the boundaries of the zone may be modified to account for this increase.

In various embodiments, backend server 302 may determine one or more surge pricing parameters for the zones 404. For example, the backend server 302 may determine one or more surge pricing parameters on a per-zone basis. In some embodiments, the one or more surge pricing parameters are communicated to the passenger computing device for presentation to the passenger when the passenger requests a ride. A surge pricing parameter may be, for example, an absolute price for a transportation request taking surge factors into account, a surge cap specifying the amount of price for a ride that is subject to surge pricing, or it may be a multiplier of a baseline or default rate normally charged for rides originating from the pickup location, which in some embodiments may be a regional baseline applicable to a large region (e.g., the baseline for Kansas City, Mo. may be different from the baseline for New York, N.Y., which may be different from the baseline for Los Angeles, Calif.). If the surge pricing parameter is a multiplier, it may be expressed in a form such as 1.05× (for a zone with near-baseline demand), 1.3× (for a zone with slightly elevated demand), 3.2× (for a zone with very high demand), or 0.85× (for a discounted zone, such as a zone that is a target of a promotion, or a zone that is in low demand). The surge multiplier may be based on any suitable information, such as supply and demand (e.g., the number of drivers in the zone and/or nearby zones and the rate of passenger requests in the zone and/or nearby zones), and/or other relevant factors such as time of day, traffic conditions, weather conditions, road conditions, or other factors. In various embodiments, any of the factors described below in conjunction with estimating a supply of passenger requests and a baseline driver supply may be used to calculate a surge pricing parameter for a zone. In various embodiments, when the surge multiplier is updated, if the amount of demand exceeds the amount of supply (or the demand to supply ratio has increased relative to the last calculated demand to supply ratio), then the surge multiplier for the zone may increase. Conversely, if the amount of supply exceeds the amount of demand (or the demand to supply ratio has decreased relative to the last calculated demand to supply ratio), the surge multiplier may decrease.

In particular embodiments, minimum fare offers may be managed on a per-zone basis. Thus, for each zone, backend system 116 may determine whether minimum fare offers are to be sent to drivers located within the zone, how many minimum fare offers should be sent, when to send minimum fare offers, and the values of minimum fare offer parameters associated with minimum fare offers.

Figure 5:
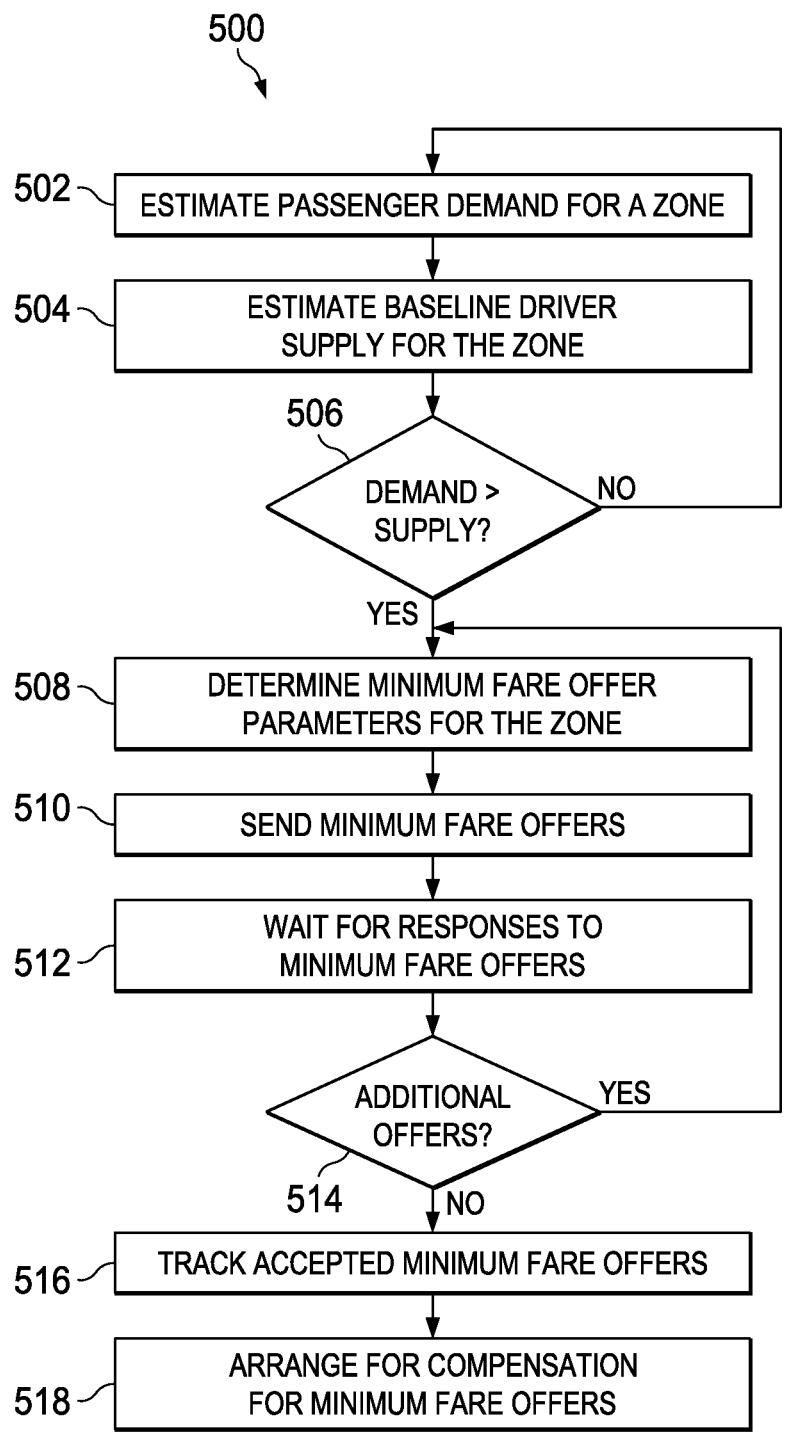
FIG. 5 illustrates an example flow for reserving drivers with minimum fare offers for a transportation service in accordance with certain embodiments.

FIG. 5 illustrates an example flow 500 for reserving drivers with minimum fare offers in accordance with certain embodiments. Some or all of the operations of flow 500 may be performed by any suitable logic of system 100, such as a backend system, backend server 302, and/or other components.

At 502, passenger demand for a zone is estimated. In various embodiments, backend server 302 may estimate the number of passenger requests as a function of time (e.g., at a particular point in time or over one or more intervals of time). As an example, backend server 302 may determine the number of requests currently being serviced and/or the number of requests that are awaiting assignment of a driver. As another example, backend server 302 may estimate the average number of requests that will be received and/or be serviced per an interval of time (e.g., per minute, per five minutes, per hour, etc.). As another example, backend server 302 may estimate the number of requests that are expected within multiple intervals of time that each begin at a different time, such as the number of requests expected from 6:00 PM-6:05 PM, from 6:05 PM-6:10 PM, etc. The passenger demand may be estimated relative to any suitable time. For example, the passenger demand may be estimated for the next five minutes. As another example, the passenger demand may be estimated for a time interval beginning ten minutes in the future and ending fifteen minutes in the future.

The passenger demand within a zone may be estimated at any suitable interval. For example, the estimation of the passenger demand may be updated periodically (e.g., every 2 minutes, every 5 minutes, or at any other period interval) or in response to an event (such as a rapid change in the rate at which transportation requests are being received).

The estimation of demand may be based on the number of pending transportation requests (i.e., transportation requests that have been received but not assigned to a driver and/or transportation requests that are currently being serviced) originating from the zone (and/or neighboring zones), the number of transportation requests received over a particular time interval (e.g., over a recent time interval such as the last 10 minutes) with a pickup location in the zone (and/or neighboring zones), the number of transportation requests expected to be received for a particular time interval (with pickup locations in the zone and/or neighboring zones), and/or other suitable information. In various embodiments, the number of transportation requests expected to be received may be based on data stored in historical request data 326 (e.g., the number of requests historically received during a time period that is similar to the time period for which the estimate is being made). As just one example, the number of transportation requests expected to be received on a Wednesday morning at 7:30 AM-7:45 AM may be based on the number of transportation requests received over the same time period on one or more previous Wednesdays.

In various embodiments, the number of historical passenger requests over a timeframe may be adjusted by a factor indicative of the number of recent requests. For example, continuing the example above, the number of requests received from 7:15 AM-7:30 AM on the Wednesday morning relative to historical requests received at a similar time on one or more previous Wednesdays may be ascertained and used to adjust the number of historical requests in order to estimate an expected number of requests to be received that Wednesday morning from 7:30 AM-7:45 AM. For example, if the transportation service is receiving a number of requests that morning that is 1.2× higher than usual, an estimate that is based on historical requests may be adjusted upwards by a factor of 1.2×. Other embodiments may include the adjustment of a number derived from historical requests in any suitable manner based on current demand to estimate a number of passenger requests to be received over a particular time period.

In various embodiments, the estimated passenger demand for a zone may be based on one or more events in the zone or a nearby zone. The number of expected passenger requests may be determined in any suitable manner. For example, backend server 302 may determine an expected number of passengers for a particular time period based on any suitable factors such as the expected total attendance at the event (e.g., as indicated by an event information source or as derived from records of similar past events stored in event data 332), the percentage of the population (e.g., in a particular region including the location of the event) that utilize the transportation service, a number of passengers detected as attending the event (e.g., based on GPS coordinates received from passenger mobile devices), the location of the event (some locations may result in a higher rate of transportation requests than others), the time of the event, past passenger requests from similar events (e.g., as stored in historical request data 326 and/or event data 332), data representing the timing of requests associated with past events (e.g., as stored in historical request data 326, event data 332, and/or other data), and/or other suitable factors. In one embodiment, the expected total attendance at the event may be based on a number of users of a social network that have indicated an intent to attend the event. As just one example, the number of transportation requests received may spike within a first zone prior to the beginning of a nearby event (e.g., being held in a second zone) and may spike within the second zone at the end of the event.

In various embodiments, the number of historical requests over a timeframe may be adjusted by a factor indicative of the number of recent requests. For example, data associated with one or more previous football games may indicate that 20 requests are likely to be received from a zone during a first 5 minute period before a football game is to start on a given day and 30 requests are likely to be received from the zone during a second 5 minute period before the football game. However, if a time period corresponding (i.e., the same number of minutes before the start of the game) to the first 5 minute period yields only 10 passenger requests, then the estimate for the second 5 minute period may be adjusted downward (e.g., to 15 passenger requests or other number). Any suitable number of historical time periods may be compared with recent time periods during the estimation of passenger demand.

In various embodiments, the passenger demand for a future time period may be estimated based on a combination of one or more events, historical passenger request data, and/or current passenger request data. For example, the expected number of passenger requests based on historical passenger request data for a particular time period may be determined, the increase in requests expected to be generated due to one or more events may be added, and the result may be adjusted by the current rate of passenger requests relative to expected requests (which could also be based on historical passenger request data and/or event data).

At 504, a baseline driver supply for the zone is estimated. In various embodiments, the baseline driver supply estimate may indicate the number of drivers that are expected to accept (or be available to accept) transportation requests over a particular time period or particular point in time. For example, backend server 302 may estimate the number of drivers that are expected to be available at 6:15 PM on a particular date, the number of drivers that will accept transportation requests from 6:30 PM-6:45 PM on a particular date, or the number of drivers to be available and/or accept transportation requests over the next five minutes. As another example, backend server 302 may estimate (or determine) that 8 drivers are currently waiting for transportation requests in a particular zone. In various embodiments, a time or time period for which the baseline driver supply is calculated may be equal to or at least overlap with a time period or time for which passenger demand is estimated. In various embodiments, the estimated baseline driver supply may be comparable to the estimated passenger demand (e.g., in order to determine whether the estimated baseline driver supply is sufficient to meet the estimated passenger demand).

The baseline driver supply may be estimated relative to any suitable time. For example, the baseline driver supply may be estimated for the next five minutes. As another example, the baseline driver supply may be estimated for a time interval beginning ten minutes in the future and ending fifteen minutes in the future. In various embodiments, the baseline driver supply may be estimated for multiple intervals (e.g., 6:00 PM-6:05 PM, 6:05 PM-6:10 PM, etc.)

The baseline driver supply of a zone may be estimated at any suitable interval. For example, the estimation of the baseline driver supply may be updated periodically (e.g., every 2 minutes, every 5 minutes, or at any other period interval) or in response to an event (such as a rapid change in driver availability or the rate at which transportation requests are being received).

The baseline driver supply may be estimated based on historical and/or current data accessible by backend server 302 about the number of drivers located (or expected to be located) in the zone or otherwise available to fulfill transportation requests with pickup locations within the zone (e.g., the indication of supply may be based on the number of drivers in neighboring zones and/or within a certain distance or driving time of one or more locations of the zone) or other suitable information. For example, the baseline driver supply may be based on the current number or drivers located in the zone that are available to transport passengers (which could include drivers that are currently waiting due to having accepted a minimum fare offer and drivers that are waiting for a transportation request independent of an minimum fare offer). As another example, the baseline driver supply may be based on the current number or drivers located at locations that are within a threshold distance from the zone that are available to transport passengers (which could include drivers that are currently waiting due to having accepted a minimum fare offer and drivers that are waiting for a transportation request independent of an minimum fare offer). As another example, the baseline driver supply may be based on the historical number of drivers that are available at a particular time or time period (e.g., the amount of drivers that are usually available at a particular time and/or the number of drivers that are usually available to transport passengers in connection with a particular type of event) and/or the number of drivers that have accepted rides over one or more particular time periods. As another example, the baseline driver supply may be based on a number of drivers that are expected to finish transporting passenger(s) to the particular zone (or nearby locations) during (or before) the relevant time period (thus becoming available to transport passengers from the particular zone). In various embodiments, historical data may be adjusted by current conditions (e.g., the number of drivers available or the rate of servicing of transportation requests) when used to estimate a baseline driver supply.

The baseline driver supply for a zone may also be based on the likelihood of one or more drivers being busy at a particular time due to accepting a ride from a different transportation service, accepting a ride originating in another zone, or otherwise becoming unavailable to transport passengers during the relevant time period. For example, backend server 302 may access historical data tracking the availability of drivers to determine a likelihood of one or more drivers becoming unavailable. As one example, backend server 302 may determine that over a five minute period, any given driver has a 25% chance of becoming unavailable by the end of the period. In various embodiments, the likelihood of one or more drivers becoming unavailable may be based on historical data measuring availability during the relevant time period (e.g., day and time or a time period following an event). Thus an estimate of a baseline driver supply may factor in the likelihood of available drivers becoming unavailable during the relevant time period.

At 506, a determination is made as to whether passenger demand is greater than driver supply (i.e., whether driver supply is at an acceptable level relative to passenger demand). For example, a determination may be made as to whether actual demand is greater than supply (e.g., at the moment the determination is made). As another example, a determination may be made as to whether expected demand is greater than expected supply (e.g., at a fixed time in the future or during a future time interval). As one example, the backend server 302 may determine whether the estimated passenger demand exceeds the estimated driver supply for the next X minutes (where X is any suitable number). As another example, the backend server 302 may determine whether the estimated passenger demand exceeds the estimated driver supply for a time period beginning in the future (e.g., 10 minutes from the time the determination is made). As another example, the backend server 302 may determine whether the estimated passenger demand will exceed the estimated driver supply at any time over a particular interval (e.g., an hour).

The determination of whether the passenger demand is greater than driver supply may be based on any suitable indications of actual or expected passenger demand and driver supply. As an example, backend server 302 may determine that demand is greater when the number of passenger requests over a particular time period exceeds the expected number of requests to be serviced by drivers or exceeds the number of requests to be serviced by a particular threshold (where the threshold may be a number, percentage, or other threshold). As another example, backend server 302 may determine that demand is greater than supply when the number of actual or expected passengers waiting to receive service at a particular time is greater than a threshold.

As another example, backend server 302 may determine that demand is greater than supply when an actual or expected wait time for a ride (or an average wait time for a plurality of rides or other metric aggregating information from various actual or expected wait times) exceeds a threshold. In various embodiments, an expected wait time (or average wait time) may be estimated using a current and/or expected supply of drivers and passenger demand. In various embodiments, the expected wait time may be based on historical wait times based on historical supply and demand.

As another example, backend server 302 may determine that demand is greater than supply when an actual or expected surge pricing parameter is above a certain threshold. The surge pricing parameter may itself be based on supply and demand (e.g., as explained above).

In other embodiments, any suitable supply and demand metrics may be compared or analyzed to determine whether the supply of drivers is at an acceptable level relative to the demand of passenger requests. In particular embodiments, the determination of whether demand is greater than supply may be made based on a combination of any of the above metrics or other suitable metrics. For example, in a particular embodiment, two or more respective thresholds (e.g., wait time and number of passengers waiting to be assigned a driver) must be met before the demand is determined to be greater than the supply. As another example, a weighted score may be calculated based on the current state of any of the above supply and demand determinations (where each supply and demand metric may have an associated weight) and the weighted score may be compared against a threshold to determine whether the demand is greater than the supply. For example, an average expected wait time may be weighted at 0.75 and a surge pricing parameter may be weighted at 0.25. A score may be calculated for the average expected wait time (where the score increases as the wait time increases) and multiplied by 0.75 and then added to a score calculated for the surge pricing parameter (where the score increases as the surge pricing parameter increases) multiplied by 0.25 and the result may be compared against a threshold to determine whether the demand is greater than the supply.

If the demand is not greater than the supply at 506, the flow may return to 502 where the passenger demand may be estimated again (e.g., after waiting for a period of time or in response to a trigger indicating that passenger demand or driver supply has changed). If the demand is greater than the supply, then backend server 302 may decide to send one or more minimum fare offers and may determine minimum fare offer parameters at 508.

Any suitable minimum fare offer parameters may be determined. For example, backend server 302 may determine the number of minimum fare offers to send, which drivers to send the minimum fare offers to, when to send the minimum fare offers, the minimum fare amounts for each minimum fare offer (i.e., the minimum amount of compensation a driver will get for fulfilling the terms of the minimum fare offer), the durations of the minimum fare offers (i.e., the length of time that the driver must drive and/or remain available to drive for the transportation service to receive the minimum fare), geographical limitations for the minimum fare offers (e.g., the driver may be required to stay within a zone or a portion thereof during the duration of the minimum fare offer or while the driver is waiting to be assigned a ride), terms describing which transportation requests the driver must fulfill (e.g., the driver may be allowed to reject transportation requests with destination locations that are more than a specified distance away from the pickup location, the current location of the driver, a boundary of the zone, or other particular location), a minimum transportation request acceptance rate (e.g., the driver may be required to accept at least 80% of the rides sent to him during the duration of the minimum fare offer), or other suitable parameters.

The minimum fare offer parameters may be based on any suitable information. Any one or more of the parameters may be based on one or more suitable factors, such as one or more metrics indicative of passenger demand and driver supply, an estimated passenger supply, an estimated baseline driver supply, historical minimum fare offers (and success rates), historical driver availability data, or other suitable information (e.g., any of the information stored by data store 304). Any of the parameters values may be based on the extent to which passenger demand exceeds driver supply (e.g., parameter values that would result in a higher number of accepted minimum fare offers may be used when the demand greatly exceeds the supply while less aggressive values may be used when the demand and supply are more closely matched).

In a particular embodiment, one or more minimum fare offer parameters are based on the extent to which the passenger demand is greater than the driver supply. For example, the number of minimum fare offers sent may depend on the magnitude of the disparity between the passenger demand and the driver supply (e.g., more offers are sent if the disparity is larger). As another example, as the disparity between the passenger demand and the driver supply rises, the average minimum fare offered may also rise to entice drivers to accept minimum fare offers. In various embodiments, various threshold levels of a supply and demand metric may correspond to various numbers of minimum fare offers or the magnitude of a metric indicating the relationship between supply and demand may be multiplied by a conversion factor to determine a number of minimum fare offers to be sent.

In various embodiments, passenger requests and driver supply may be estimated as a function of time and the number of minimum fare offers and the times at which the offers are sent may be selected based on the difference between the expected passenger requests and the baseline driver supply as a function of time. For example, it is common for attendees of a sporting event to leave the event early to avoid crowds. Thus, backend server 302 may offer minimum fare offers at periodic intervals leading up to the estimated end time of the event with progressively more minimum fare offers being made towards the end time of the event to increase the supply of drivers available when the event finishes.

In a particular embodiment, one or more minimum fare offer parameters are based on the number of drivers needed to achieve a specified service level at one or more particular times or over a particular time period. For example, the number of minimum fare offers sent may be based on the expected number of additional drivers needed to provide an average wait time of less than 5 minutes over a half hour period. The service level may be specified in any suitable manner, such as an average wait time, a maximum wait time for any prospective transportation request within the zone, a ratio of available drivers to passenger requests, or other suitable service metric. The determination of the number of drivers need to achieve the specified service level may be based on any suitable data, such as the current and/or expected supply and demand, the relationship of historical supply and demand to historical values of the relevant service level, and/or other suitable factors.

In a particular embodiment, one or more minimum fare offer parameters are based on expected revenue to be generated by one or more drivers over one or more time periods. For example, the minimum fare amounts of the minimum fare offers (which may be equal or determined individually for each offer) may be based on the expected revenue of one or more drivers over the duration of the minimum fare offers. In a particular embodiment, for a particular minimum fare offer to be sent to a particular driver, the minimum fare may be based on the expected revenue to be generated by the driver during the duration of the minimum fare offer (e.g., the minimum fare may be equal to the portion of the revenue expected to be earned by the driver during the duration or may be the portion of the expected revenue adjusted downwards or upwards in any suitable manner, e.g., by a multiplier). In another embodiment, for a particular minimum fare offer to be sent to a particular driver, the minimum fare may be based on the expected revenue to be generated by a plurality of drivers during the duration of the minimum fare offer (e.g., the minimum fare may be equal to the portion expected to be earned by the driver based on the average expected revenue to be generated by a plurality of drivers during the duration or may be the portion adjusted downwards or upwards in any suitable manner, e.g., by a multiplier). In a particular embodiment, the magnitude of an upward adjustment may be based on the extent to which passenger demand is greater than driver supply (e.g., the minimum fare amounts may be increased in times of heavy demand in order to entice drivers to accept the minimum fare offers).

In a particular embodiment, the minimum fare may be equal to a portion of revenue that the driver is expected to earn during the duration with a particular level of certainty based on historical transportation request data. For example, if the particular level of certainty is 80% and past data shows an 80% likelihood that the driver will generate $150 of revenue during the duration, the minimum fare may be equal to the driver's portion of $150 of revenue. In various embodiments, the determination of the expected revenue to be generated may include generating a distribution of or performing other analysis on historical revenues generated by one or more drivers under similar circumstances (e.g., same duration, same day, same time of day, same location, and/or other suitable circumstances).

In a particular embodiment, backend server 302 may calculate a revenue delta which represents the expected change in revenue by using the baseline driver supply versus using the baseline driver supply and any additional drivers added to the supply via minimum fare offers. In various embodiments, the number of minimum fare offers and/or the minimum fare amounts may be determined based on the relative importance of expected revenue and level of service (such as any of the service metrics described above or other suitable measure of service). For example, if the level of service provided is a low priority, then the number of minimum fare offers and/or minimum fare amounts may be determined in order to maximize the revenue delta. Alternatively, if the level of service provided is a high priority, then the number of minimum fare offers and/or minimum fare amounts may be determined to maximize the level of service, meet a threshold service level, or otherwise improve the level of service relative to the service expected to be provided by the baseline driver supply. In some cases, this may result in a negative revenue delta, which the transportation service may be willing to incur if keeping customers satisfied is of paramount importance to the transportation service. In various embodiments, the transportation service may specify a minimum revenue delta (e.g., a maximum loss) and the number of minimum fare offers and/or the minimum fare amounts may be determined such that the revenue delta does not fall below the specified minimum revenue delta. In a particular embodiment, the backend server 302 may utilize a utility function that weights the importance of revenue and service (e.g., using weights provided by the transportation service) and determines the number of minimum fare offers and/or minimum fare amounts in a manner that maximizes the value of the utility function.

As another example, backend server 302 may determine which drivers will be the recipients of the minimum fare offers. In particular embodiments, when determining which drivers will be the recipients of the minimum fare offers for a particular zone, the backend server 302 may limit the sending of offers to drivers located in the zone, drivers within a particular range of the zone, and/or drivers that are predicted to be located in the zone or within a particular range of the zone at the time the offer is to be sent (e.g., based on an analysis of a ride the driver is currently servicing) or the offer is to begin (e.g., an offer could be sent before the offer begins such as when a particular driver is nearing the end of a transportation request). In particular embodiments, drivers may be selected for minimum fare offers based on historical records of minimum fare offers (stored in minimum fare offer data 336) sent to the drivers indicating how likely the driver is to accept the minimum fare offer and/or fulfill the terms of the minimum fare offer (e.g., accept transportation requests from the transportation service during the duration of the minimum fare offer). In various embodiments, drivers may be selected for minimum fare offers based on performance scores of the drivers. In a particular embodiment, the availability data associated with various users may be used to determine whether to send minimum fare offers to the users. For example, if a particular driver displays a pattern of availability and/or ride acceptance indicating that the driver is not associated with other transportation services, the backend server 302 may choose not to send a minimum fare offer to the driver since the driver may not need to be incentivized to remain available for the transportation service.

In a particular embodiment, if a driver rejects a minimum fare offer, the driver is not offered another minimum fare offer for a particular period of time. The period of time may be uniform across all drivers or may be variable for each driver and based on any suitable factors, such as the number of minimum fare offers rejected by the driver, the percentage of minimum fare offers rejected by the driver, a performance score of the driver, other suitable factors, or any combination thereof.

In a particular embodiment, backend server 302 may determine a target number of drivers to add to the baseline driver supply and may then determine the number of minimum fare offers sent based on the target number of drivers and an expected acceptance rate (e.g., based on historical minimum fare offer data).

Backend server 302 may also determine the durations of the minimum fare offers, which may be the same for each offer (or each set of offers that are sent at the same time) or may vary from offer to offer. The duration of a minimum fare offer may specify a length of time over which the driver is to remain available to transport passengers for the transportation service. The duration of one or more rides may be based on the amount of time that passenger demand is expected to be greater than driver supply.

Backend server 302 may also determine what times the offers are to be sent. In various embodiments, multiple offers may be sent at the same time. In other embodiments, offers may be staggered in time based on the one or more metrics of driver supply and passenger demand.

Minimum fare mode parameters may be determined at any suitable intervals or in response to any suitable triggers. For example, minimum fare mode parameters may be determined periodically (e.g., every 2 minutes, every 5 minutes, or at any other period interval) or in response to a trigger (such as a rapid change in demand or supply or when a metric crosses a threshold).

At 510, minimum fare offers are sent to one or more drivers. In various embodiments, characteristics associated with an minimum fare offer may be similar to characteristics associated with a standard transportation request. For example, an incoming minimum fare offer may cause driver computing device 108 to play the same sound as an incoming transportation request. As another example, a driver may have the same amount of time to accept an minimum fare offer as an incoming transportation request. In other embodiments, the characteristics may be different from characteristics associated with a standard transportation request. For example, a driver may receive additional time to respond to an incoming minimum fare offer. In various embodiments, the minimum fare offer may specify any or all of the minimum fare offer parameters discussed above.

At 512, backend server 302 waits for responses to minimum fare offers. An acceptance to an minimum fare offer may be sent to the backend server 302 by a driver computing device 108. Similarly, a rejection to an minimum fare offer may be sent to the backend server 302 by a driver computing device 108. In various embodiments, a rejection to an minimum fare offer may be inferred if an acceptance is not received within a predetermined period of time.

At 514, backend server determines whether to send additional minimum fare offers to drivers. In various embodiments, this determination may be based on how many of the offers sent at 510 were accepted. For example, the number of additional offers sent may be equal to the number of offers that were rejected. As another example, the number of additional offers sent may be different from the number of offers that were rejected (e.g., if the offers were rejected by drivers that were considered to be likely to accept the offers but new offers are to be sent to drivers that are not considered to be likely to accept the offers then additional new minimum fare offers may be sent). The determination of how many offers to send and who to send the offers to may use any of the factors described above.

In a particular embodiment, based on the rate of minimum fare offer acceptance, the average minimum fare amounts in additional minimum fare offers sent may be adjusted upwards or downwards from the average minimum fare amounts of the previously sent minimum fare offers. For example, if the acceptance rate of minimum fare offers is lower than expected, the minimum fare amounts may be adjusted upwards to incentivize acceptance of the additional offers. As another example, if the acceptance rate of minimum fare offers is higher than expected, then the minimum fare amounts specified in future minimum fare offers may be adjusted downward.

At 516, the accepted minimum fare offers are tracked. Backend server 302 may keep track of which drivers have accepted minimum fare offers and the time at which the minimum fare offers were accepted. Backend server 302 may also track the actions of the drivers that have accepted minimum fare offers to determine whether the drivers are complying with the terms of the minimum fare offers. At 518, backend server 302 arranges for compensation for minimum fare offers. If the driver's share of revenue generated during the duration of the minimum fare offer is greater than the minimum fare amount, then the driver receives the share of revenue generated. If the driver's share of revenue generated during the duration of the minimum fare offer is less than the minimum fare amount, then the driver receives the minimum fare amount (unless the driver did not comply with the terms of the minimum fare amount in which case the driver would receive the share of the revenue generated. Compensation may be arranged in any suitable manner, such as by storing an indication of the amount earned through the minimum fare offer. In various embodiments, compensation may be arranged using the same methods used to arrange for compensation for the fulfillment of a standard transportation request.

Some of the operations illustrated in FIG. 5 may be repeated, combined, modified or deleted where appropriate, and additional steps may also be included. Additionally, operations may be performed in any suitable order or concurrently without departing from the scope of particular embodiments.

It is important to note that the operations in FIG. 5 illustrate only some of the possible scenarios that may be executed by, or within, the various components of the system described herein. Some of these operations may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may be performed by any suitable component(s) of the system. For example, certain functionality described herein as being performed by backend server 302, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 302 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke subsection (f) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining, by at least one processing device of one or more backend servers, a geographic zone for transmitting minimum fare offers to computing devices positioned within the geographic zone;
   identifying a first driver computing device executing a provider mobile application and transmitting digital information to the one or more backend servers;
   authenticating the first driver computing device via the provider mobile application;
   determining, based on digital signals transmitted from the first driver computing device, that the first driver computing device is in an available state;
   upon determining that the first driver computing device is in the available state, determining, via a global positioning system associated with the first driver computing device, that the first driver computing device is positioned within the geographic zone for transmitting the minimum fare offers;
   based on determining, at the one or more backend servers via the global positioning system, that the first driver computing device is positioned within the geographic zone for transmitting the minimum fare offers, providing, for display via the provider mobile application on the first driver computing device, a set of minimum fare offer parameters for a first minimum fare offer, the set of minimum fare offer parameters comprising a first minimum amount of compensation for a first time period and a digital map comprising geographical limitations for remaining within the geographic zone for at least a portion of the first time period;
   after receiving an indication, at the one or more backend servers via the provider mobile application, of acceptance of the first minimum fare offer from the first driver computing device located within the geographic zone:
      receiving, via the one or more backend servers, a digital request for a ride via a passenger application of a passenger computing device;
      authenticating the passenger computing device via the passenger application by comparing credentials transmitted via the passenger application with stored authentication information associated with a digital passenger account corresponding to the passenger computing device;
      based on authenticating the passenger computing device and receiving the digital request, transmitting, to the first driver computing device, digital navigation instructions corresponding to the ride;
      providing, via the provider mobile application of the first driver computing device and utilizing the global positioning system of the first driver computing device, a map comprising real-time driver device locations relative to the geographical limitations for remaining within the geographic zone;
      providing, via the passenger application of the passenger computing device and utilizing the global positioning system of the first driver computing device, an additional map comprising real-time updates of the driver device locations;
      tracking compensation accrued during the first time period for servicing the ride corresponding to the passenger computing device; and
      tracking, via the global positioning system of the first driver computing device, a location of the first driver computing device to determine whether the first driver computing device is positioned within the geographic zone during the first time period according to the set of minimum fare offer parameters; and
   based on the first driver computing device being positioned within the geographic zone during the first time period, determining, utilizing the one or more backend servers, compensation for the first time period, wherein the determined compensation is the greater of the first minimum amount of compensation specified in the first minimum fare offer and the tracked compensation accrued during the first time period for servicing the ride.

2. The method of claim 1, further comprising:
   providing, for display on a second driver computing device, an additional set of minimum fare offer parameters comprising a second minimum amount of compensation for a second time period and geographical limitations for remaining within a second geographic zone for at least a portion of the second time period;
   tracking compensation corresponding to the second driver computing device during the second time period for servicing at least one ride;
   tracking, based on GPS data for the second driver computing device, a location of the second driver computing device to determine whether the second driver computing device is positioned within the second geographic zone during the second time period according to the additional set of minimum fare offer parameters; and
   in response to determining that the second driver computing device is not positioned within the second geographic zone during the second time period, determining that the second driver computing device does not qualify for the second minimum amount of compensation.

3. The method of claim 1, wherein:
   tracking the location of the first driver computing device comprises determining whether the first driver computing device is positioned within the geographic zone during the entire duration of the first time period based on periodic digital communications from the first driver computing device comprising updates via the global positioning system throughout the entire duration of the first time period; and
   determining the compensation for the first time period is based on the first driver computing device being positioned within the geographic zone during the entire duration of the first time period.

4. The method of claim 1, further comprising determining that the first driver computing device is in the available state by detecting an indication of a user input via a user interface of the provider mobile application.

5. The method of claim 1, wherein tracking the location of the first driver computing device comprises determining whether the first driver computing device is positioned within the geographic zone while waiting for a ride assignment during the first time period.

6. The method of claim 1, wherein:
tracking the location of the first driver computing device comprises determining whether the first driver computing device is positioned within the geographic zone for a threshold duration of the first time period; and
determining the compensation for the first time period is based on the first driver computing device being positioned within the geographic zone for the threshold duration of the first time period.

7. The method of claim 1, further comprising providing, for display on the first driver computing device, a minimum transportation request acceptance rate for the first driver computing device to maintain during the first time period.

8. The method of claim 1, wherein:
tracking the location of the first driver computing device comprises determining whether the first driver computing device is positioned within a sub-zone of the geographic zone during the first time period; and
determining the compensation for the first time period is based on the first driver computing device being positioned within the sub-zone of the geographic zone during the first time period.

9. The method of claim 1, wherein the geographic zone is a dynamic geographic zone comprising a delineation of geographical boundaries that can change as a function of time.

10. The method of claim 1, wherein the first driver computing device is selected to receive the first minimum fare offer based on historical data indicating a likelihood of the first driver computing device becoming unavailable to transport passengers.

11. The method of claim 1, further comprising determining that tracked compensation accrued during the first time period is greater than the first minimum amount of compensation in order to award the first driver computing device the tracked compensation.

12. The method of claim 1, further comprising providing, for display on the first driver computing device, an indication of transportation requests the first driver computing device is required to accept.

13. A system comprising:
at least one processor of a backend server; and
a non-transitory computer-readable storage medium comprising instructions that, when executed by the at least one processor, cause the system to:
determine a baseline driver supply corresponding to a first time period;
determine, a number of expected additional driver computing devices needed to achieve a specified service level during the first time period based on the baseline driver supply;
based on the baseline driver supply and the number of expected additional driver computing devices, identify a number of minimum fare offers to transmit to driver computing devices positioned within a geographic zone for transmitting minimum fare offers;
identify a first driver computing device executing a provider mobile application and transmitting digital information to the backend server;
authenticate the first driver computing device via the provider mobile application;
determine, based on digital signals transmitted from the first driver computing device, that the first driver computing device is in an available state;
determine, via a global positioning system associated with the first driver computing device, that the first driver computing device is positioned within the geographic zone for transmitting the minimum fare offers;
based on determining that the first driver computing device is in the available state, and determining that the first driver computing device is positioned within the geographic zone for transmitting the minimum fare offers, transmit a first minimum fare offer of the number of minimum fare offers to the first driver computing device, the first minimum fare offer specifying a first minimum amount of compensation for the first time period and geographical limitations for remaining within the geographic zone for at least a portion of the first time period;
after receiving an indication of acceptance of the first minimum fare offer from the first driver computing device located within the geographic zone:
receive a digital request for a ride via a passenger application of a passenger computing device;
authenticate the passenger computing device via the passenger application by comparing credentials transmitted via the passenger application with stored authentication information associated with a digital passenger account corresponding to the passenger computing device;
based on authenticating the passenger computing device and receiving the digital request, transmit, to the first driver computing device, digital navigation instructions corresponding to the ride;
provide, via the provider mobile application of the first driver computing device and utilizing the global positioning system of the first driver computing device, a map comprising real-time driver device locations relative to the geographical limitations for remaining within the geographic zone;
provide, via the passenger application of the passenger computing device and utilizing the global positioning system of the first driver computing device, an additional map comprising real-time updates of the driver device locations;
track compensation accrued during the first time period for servicing the ride corresponding to the passenger computing device; and
track, via the global positioning system of the first driver computing device, a location of the first driver computing device to determine whether the first driver computing device is positioned within the geographic zone during the first time period; and
based on the first driver computing device being positioned within the geographic zone during the first time period, determine compensation for the first time period, wherein the determined compensation is the greater of the first minimum amount of compensation specified in the first minimum fare offer and the tracked compensation accrued during the first time period for servicing the ride.

14. The system of claim 13, further comprising instructions that, when executed by the at least one processor, cause the system to:
transmit a second minimum fare offer of the number of minimum fare offers to a second driver computing device, the second minimum fare offer specifying a second minimum amount of compensation when the second driver computing device is positioned within a second geographic zone during a second time period;

track compensation corresponding to the second driver computing device during the second time period for servicing at least one ride;

track, based on GPS data for the second driver computing device, a location of the second driver computing device to determine whether the second driver computing device is positioned within the second geographic zone during the second time period; and in response to a determination that the second driver computing device is not positioned within the second geographic zone during the second time period, determine that the second driver computing device does not qualify for the second minimum amount of compensation.

15. The system of claim 13, further comprising instructions that, when executed by the at least one processor, cause the system to:

determine the number of expected additional driver computing devices by determining a number of driver computing devices needed to achieve the specified service level comprising a threshold wait time over a predetermined amount of time, the threshold wait time including one of an average wait time or a maximum wait time for the geographic zone.

16. The system of claim 13, further comprising instructions that, when executed by the at least one processor, cause the system to determine the specified service level by identifying a historical supply of driver computing devices relative to historical service levels.

17. At least one computer-readable non-transitory media comprising computer-executable instructions that, when executed by at least one processor, cause the at least one processor to:

based on monitoring changing conditions transmitted via a plurality of passenger mobile devices and driver mobile devices within an area over time, determine a dynamic geographic zone for transmitting minimum fare offers to computing devices positioned within the dynamic geographic zone;

identifying a first driver computing device executing a provider mobile application;

authenticating the first driver computing device via the provider mobile application;

determining, based on digital signals transmitted from the first driver computing device, that the first driver computing device is in an available state;

determine, via a global positioning system associated with the first driver computing device, that a first driver computing device is positioned within the dynamic geographic zone for transmitting the minimum fare offers;

based on determining that the first driver computing device is in the available state, and determining that the first driver computing device is positioned within the dynamic geographic zone for transmitting the minimum fare offers, transmit a first minimum fare offer to the first driver computing device, the first minimum fare offer specifying a first minimum fare offer value for a first time period and geographical limitations for remaining within the dynamic geographic zone for at least a portion of the first time period;

after receiving an indication of acceptance of the first minimum fare offer from the first driver computing device located within the dynamic geographic zone:

receive a digital request for a ride via a passenger application of a passenger computing device;

authenticate the passenger computing device via the passenger application by comparing credentials transmitted via the passenger application with stored authentication information associated with a digital passenger account corresponding to the passenger computing device;

based on authenticating the passenger computing device and receiving the digital request, transmit, to the first driver computing device, digital navigation instructions corresponding to the ride;

provide, via the provider mobile application of the first driver computing device and utilizing the global positioning system of the first driver computing device, a map comprising real-time driver device locations relative to the geographical limitations for remaining within the dynamic geographic zone;

provide, via the passenger application of the passenger computing device and utilizing the global positioning system of the first driver computing device, an additional map comprising real-time updates of the driver device locations;

track compensation accrued during the first time period for servicing the ride corresponding to the passenger computing device; and track, via the global positioning system of the first driver computing device, a location of the first driver computing device to determine whether the first driver computing device is positioned within the dynamic geographic zone during the first time period; and based on the first driver computing device being positioned within the dynamic geographic zone during the first time period, determine compensation for the first time period, wherein the determined compensation is the greater of the first minimum fare offer value specified in the first minimum fare offer and the tracked compensation accrued during the first time period for servicing the ride.

18. The at least one computer-readable non-transitory media of claim 17, further comprising computer-executable instructions that, when executed by the at least one processor, cause the at least one processor to:

based on monitoring additional conditions transmitted via an additional plurality of passenger mobile devices and driver mobile devices within the area over time, determine a second dynamic geographic zone for transmitting minimum fare offers to computing devices positioned within the second dynamic geographic zone; and transmit a second minimum fare offer to a second driver computing device, the second minimum fare offer specifying a second minimum fare offer value for the second dynamic geographic zone during a second time period.

19. The at least one computer-readable non-transitory media of claim 18 further comprising computer-executable instructions that, when executed by the at least one processor, cause the at least one processor to:

track compensation corresponding to the second driver computing device during the second time period for servicing at least one ride;

track, based on GPS data for the second driver computing device, a location of the second driver computing device to determine whether the second driver computing device is positioned within the second dynamic geographic zone during the second time period; and in response to determining that the second driver computing device is not positioned within the second dynamic geographic zone during the second time period, determine that the second driver computing device does not qualify for the second minimum fare offer value.

20. The at least one computer-readable non-transitory media of claim 17, further comprising computer-executable instructions that, when executed by the at least one processor, cause the at least one processor to:

determine minimum fare offer values and a number of minimum fare offers to transmit utilizing an optimization model analyzing revenue and service level; and determine the minimum fare offer values and the number of minimum fare offers to transmit based on at least two or more of:

a first optimization value for the revenue and a second optimization value for the service level;

a number of expected additional driver computing devices needed to achieve a specified service level for the dynamic geographic zone; or a maximum revenue loss to satisfy the specified service level.

\* \* \* \* \*